United States Patent [19]

Wagner et al.

[11] 4,379,758

[45] Apr. 12, 1983

[54] CATALYST COMPOSITION FOR POLYMERIZING ETHYLENE

[75] Inventors: Burkhard E. Wagner, Highland Park; George L. Goeke; Frederick J. Karol, both of Belle Mead, all of N.J.; Kathleen F. George, Crosslanes, W. Va.

[73] Assignee: Union Carbide Corporation, Danbury, Conn.

[21] Appl. No.: 219,877

[22] Filed: Dec. 24, 1980

[51] Int. Cl.$^3$ ............................................... C08F 4/64
[52] U.S. Cl. .............................. 252/429 B; 252/429 C; 526/88; 526/125
[58] Field of Search ....................... 252/429 B, 429 C

[56] References Cited

U.S. PATENT DOCUMENTS 4,209,601  6/1980  Kuroda et al. .................. 252/429 B
4,239,650 12/1980  Franke et al. .................. 252/429 B

FOREIGN PATENT DOCUMENTS 2752577   6/1979  Fed. Rep. of Germany .
52-153896 12/1977  Japan .
53-5093    1/1978  Japan .
53-78286   7/1978  Japan .

OTHER PUBLICATIONS

World Patent Index Abstract 10955a/06.

*Primary Examiner*—Jacqueline V. Howard
*Attorney, Agent, or Firm*—John S. Piscitello

[57] ABSTRACT

Catalyst compositions suitable for producing high density ethylene polymers in a low pressure gas phase process with low accompanying ethylene hydrogenation are produced by forming a precursor composition from a magnesium compound, titanium compound and electron donor compound; diluting said precursor composition with an inert carrier material; treating said diluted precursor composition with a boron halide compound; and activating the precursor composition with an organo aluminum compound.

22 Claims, 1 Drawing Figure

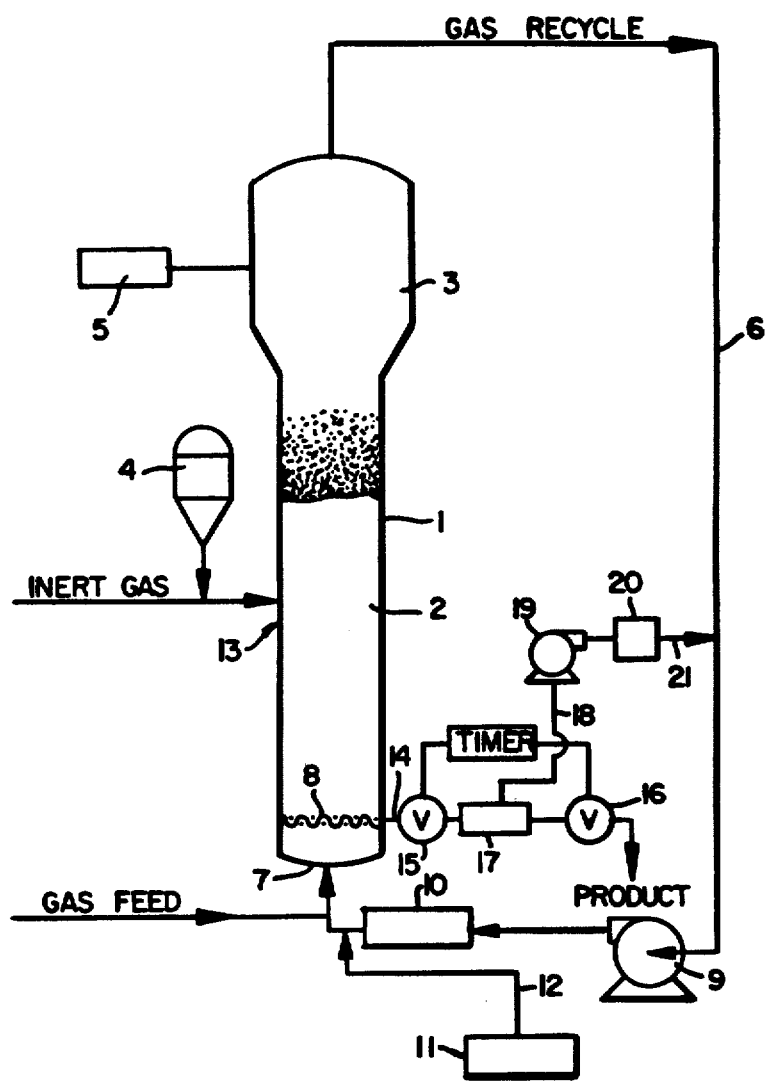

CATALYST COMPOSITION FOR POLYMERIZING ETHYLENE

FIELD OF THE INVENTION

This invention relates to an improved process for producing high density ethylene polymers having high melt indices and low melt flow ratios. More particularly, this invention relates to an improved low pressure gas phase process for producing homopolymers and copolymers of ethylene having a density of from about 0.94 g/cm$^3$ to about 0.97 g/cm$^3$, a melt index of greater than 1.0 g/10 minutes to about 100 g/10 minutes, and a melt flow ratio of from about 22 to about 32.

BACKGROUND OF THE INVENTION

Ethylene homopolymers and copolymers having high densities and high melt indices can be produced as described in European patent publication Nos. 0012147 and 0012148. In producing such polymers, it is necessary to employ high polymerization temperatures and to maintain a high hydrogen/ethylene ratio in the reactor in order to obtain polymers having melt indices greater than 1.0 g/10 minutes. Unfortunately, however, an increase in polymerization temperatures above 90° C. and the use of high hydrogen/ethylene ratios have both been found to cause a decrease in the activity of the catalysts employed in these processes. Thus, the desired polymers can only be obtained at the expense of decreased catalytic activity.

Another characteristic of the process described in European patent publication Nos. 0012147 and 0012148 is that a certain undesirable amount of ethylene hydrogenation takes place during polymerization. This ethylene hydrogenation is particularly pronounced when temperatures in excess of 90° C. and high hydrogen/ethylene ratios are employed in an attempt to obtain polymers having melt indices greater than 1.0 g/10 minutes. While the amount of ethane produced by this hydrogenation is at first relatively minor, this gaseous material gradually accumulates in the reactor and replaces the reactive monomers present. This decrease in the amount of monomer in the reactor leads to a corresponding decrease in catalyst productivity.

SUMMARY OF THE INVENTION

In accordance with the present invention, it has now been discovered that catalyst compositions having improved heat stability and suitable for use in producing high density ethylene polymers having high melt indices and low melt flow ratios in a low pressure gas phase process can be prepared by forming a precursor composition from a magnesium compound, titanium compound and electron donor compound; diluting said precursor composition with an inert carrier material; treating said diluted precursor composition with a boron halide compound; and activating the precursor composition with an organo aluminum compound. Such catalyst compositions can be employed to produce the aforesaid ethylene polymers at higher temperatures than heretofore possible while maintaining high polymer productivity and low accompanying ethylene hydrogenation.

BRIEF DESCRIPTION OF THE DRAWING

The drawing shows a gas phase fluid bed reactor system in which the catalyst system of the present invention may be employed.

DESCRIPTION OF THE PREFERRED EMBODIMENT

When treated with a boron halide compound in accordance with the present invention, the aforesaid catalyst compositions have been found to be more stable when exposed to temperatures in excess of 90° C. and to undergo less decline in activity when employed in polymerization processes above such temperatures as compared to like catalyst compositions which have not been so treated. Surprisingly, whether employed in polymerization processes above or below 90° C., such treated catalyst compositions are capable of producing polymers at higher productivities and are accompanied by less ethylene hydrogenation than when like untreated catalyst compositions are employed.

THE ETHYLENE POLYMERS

The ethylene polymers produced with the treated catalyst compositions of the present invention have a density of from about 0.94 g/cm$^3$ to about 0.97 g/cm$^3$. At a given melt index, the density of the polymers is primarily regulated by the amount of comonomer which is copolymerized with the ethylene. In the absence of comonomer, ethylene polymerizes to provide homopolymers having a density of at least about 0.96 g/cm$^3$. By the addition of progressively larger amounts of comonomer, copolymers having a progressively lower density are obtained. The amount of comonomer needed to achieve the same result will vary from comonomer to comonomer, under the same conditions. Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The copolymers produced with the treated catalyst compositions of the present invention are copolymers of a major mol percent (at least 97%) of ethylene and a minor mol percent (no more than 3%) of one or more alpha olefins containing from 3 to 8 carbon atoms. These alpha olefins, which should not contain any branching on any of their carbon atoms which is closer than the fourth carbon atom, include propylene, butene-1, pentene-1, hexene-1, 4-methylpentene-1, heptene-1 and octene-1. The preferred alpha olefins are propylene, butene-1, hexene-1, 4-methylpentene-1 and octene-1.

The melt index of a homopolymer or a copolymer is a reflection of its molecular weight. Polymers having a relatively high molecular weight, have a relatively low melt index. Ultra-high molecular weight ethylene polymers have a high load melt index (HLMI) of about 0.0 g/10 minutes, and very high molecular weight ethylene polymers have a high load melt index (HLMI) of from about 0.0 g/10 minutes to about 1.0 g/10 minutes. The polymers produced with the treated catalyse compositions of the present invention, on the other hand, have a standard or normal load melt index of greater than 1.0 g/10 minutes to about 100 g/10 minutes, preferably of from about 2.0 g/10 minutes to about 50 g/10 minutes, and a high load melt index (HLMI) of from about 22 g/10 minutes to about 2200 g/10 minutes. The melt index of the polymers is a function of a combination of the polymerization temperature of the reaction, the density of the polymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen other chain transfer agents may also be used to further increase the melt index of the polymers.

The ethylene polymers produced with the treated catalyst compositions of the present invention have a melt flow ratio (MFR) of from about 22 to about 32, preferably of from about 25 to about 30. Melt flow ratio is another means of indicating the molecular weight distribution (Mw/Mn) of a polymer. An MFR in the range of from about 22 to about 32 corresponds to a Mw/Mn of from about 2.7 to about 4.1 and an MFR in the range of from about 25 to about 30 corresponds to a Mw/Mn of from about 2.8 to about 3.6.

The polymers produced with the treated catalyst compositions of the present invention have a residual catalyst content, in terms of parts per million of titanium metal, of less than 10 parts per million (ppm) at a productivity level of at least 100,000 pounds of polymer per pound of titanium.

The polymers produced with the treated catalyst compositions of the present invention are granular materials which have an average particle size of the order of from about 0.02 to about 0.05 inches, and preferably of from about 0.02 to about 0.04 inches, in diameter. The particle size is important for the purpose of readily fluidizing the polymer particles in the fluid bed reactor, as described below. These granular materials also have a low level of fines (no greater than 4.0 percent of the total polymer product) and these fines are no greater than 125 microns in diameter.

The polymers produced with the treated catalyst compositions of the present invention have a bulk density of from about 21 to about 32 pounds per cubic foot.

HIGH ACTIVITY CATALYST

The compounds used to form the stable, high activity catalyst compositions of the present invention comprise at least one titanium compound, at least one magnesium compound, at least one electron donor compound, at least one boron halide compound, at least one activator compound and at least one inert carrier material, as defined below.

The titanium compound has the structure $$Ti(OR)_a X_b$$

wherein

R is an aliphatic or aromatic hydrocarbon radical containing from 1 to 14 carbon atoms, or COR' where R' is an aliphatic or aromatic hydrocarbon radical containing from 1 to 14 carbon atoms, X is selected from the group consisting of Cl, Br, I, or mixtures thereof, a is 0, 1 or 2, b is 1 to 4 inclusive and a +b=3 or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $$MgX_2$$

wherein X is selected from the group consisting of Cl, Br, I, or mixtures thereof. Such magnesium compounds can be used individually or in combination thereof and would include $MgCl_2$, $MgBr_2$ and $MgI_2$. Anydrous $MgCl_2$ is the particularly preferred magnesium compound.

The titanium compound and the magnesium compound should be used in a form which will facilitate their dissolution in the electron donor compound, as described herein below.

The electron donor compound in an organic compound which is liquid at 25° C. and in which the titanium compound and the magnesium compound are soluble. The electron donor compounds are known as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 3 to 4 carbon atoms; cyclic ethers containing from 3 to 4 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds would include methyl formate, ethyl acetate, butyl acetate, ethyl ether, hexyl ether, tetrahydrofuran, dioxane, acetone and methyl ethyl ketone.

The electron donors can be used individually or in combinations thereof.

The boron halide compound has the structure $$BR_c X'_{3-c}$$

wherein

R is an aliphatic or aromatic hydrocarbon radical containing from 1 to 14 carbon atoms or OR', wherein R' is also an aliphatic or aromatic hydrocarbon radical containing from 1 to 14 carbon atoms, X' is selected from the group consisting of Cl and Br, or mixtures thereof, and c is 0 or 1 when R is an aliphatic or aromatic hydrocarbon and 0, 1 or 2 when R is OR'.

The boron halide compounds can be used individually or in combination thereof, and would include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$, and $B(OC_6H_5)_2Cl$. Boron trichloride is the particularly preferred boron compound.

The activator compound has the structure $$Al(R'')_d X''_e H_f$$

where

X'' is Cl or OR''', R'' and R''' are the same or different and are saturated hydrocarbon radicals containing from 1 to 14 carbon atoms, e is 0 to 1.5, f is 1 or 0 and d+e+f=3.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 15 to 30 mols of the activator compound are used per mol of the titanium compound in activating the catalyst employed in the present invention.

The carrier materials are solid, particulate porous materials which are inert to the other components of the catalyst composition, and to the other active components of the reaction system. These carrier materials would include inorganic materials such as oxides of silicon and/or aluminum. The carrier materials are used in the form of dry powders having an average particle size of from about 10 microns to about 250 microns, and preferably from about 50 microns to about 150 microns. These materials are also porous and have a surface area of at least 3 square meters per gram, and preferably at least 50 square meters per gram. Catalyst activity or productivity is apparently also improved with silica having average pore sizes of at least 80 Angstrom units, and preferably at least 100 Angstrom units. The carrier material should be dry, that is, free of absorbed water. Drying of the carrier material is carried out by heating it at a temperature of at least 600° C. Alternatively, the carrier material dried at a temperature of at least 200° C. may be treated with about 1 weight percent to about 8 weight percent of one or more of the aluminum compounds described above. This modification of the support by the aluminum compounds provides the catalyst composition with increased activity and also improves polymer particle morphology of the resulting ethylene polymers. Other organometallic compounds, such as diethylzinc, may also be used to modify the support.

CATALYST PREPARATION: FORMATION OF PRECURSOR

The precursor composition employed in the present invention is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and in some instances by refluxing, these two compounds in the electron donor compound. After the titanium compound and the magnesium compound are dissolved, the precursor composition may be isolated by crystallization or by precipitation with an aliphatic or aromatic hydrocarbon containing from 5 to 8 carbon atoms, such as hexene, isopentane or benzene. The crystallized or precipitated precursor composition may be isolated in the form of fine, free flowing particles having an average particle size of from about 10 microns to about 100 microns after drying at temperatures up to 60° C.

About 0.5 mol to about 56 mols, and preferably about 1 to 10 mols, of the magnesium compound are used per mol of the titanium compound in preparing the catalyst compositions of the present invention.

CATALYST PREPARATION: DILUTION OF PRECURSOR WITH SUPPORT

The precursor composition is then diluted with the inert carrier material by (1) mechanically mixing or (2) impregnating such composition into the carrier material.

Mechanical mixing of the inert carrier and precursor composition is effected by blending these materials together using conventional techniques. The blended mixture suitably contains from about 10 percent by weight to about 50 percent by weight of the precursor composition.

Impregnation of the inert carrier material with the precursor composition may be accomplished by dissolving the precursor composition in the electron donor compound, and by then admixing the support with the dissolved precursor composition to impregnate the support. The solvent is then removed by drying at temperatures up to 70° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to 70° C.

When thus made as disclosed above the blended or impregnated precursor composition has the formula $$Mg_mTi_1(OR)_nX_p[ED]_q$$

wherein
ED is the electron donor compound,
m is 0.5 to 56, preferably 1.5 to 5,
n is 0, 1 or 2,
p is 2 to 116, and preferably 6 to 14,
q is 2 to 85, and preferably 3 to 10,
R is an aliphatic or aromatic hydrocarbon radical containing from 1 to 14 carbon atoms, or COR' wherein R' is also an aliphatic or aromatic hydrocarbon radical containing from 1 to 14 carbon atoms, and
X is selected from the group consisting of Cl, Br, I, or mixtures thereof.

The subscript for the element titanium (Ti) is the arabic numeral one.

Suitably, the impregnated carrier material contains from about 3 percent by weight to about 50 percent by weight, preferably from about 10 percent by weight to about 30 percent by weight, of the precursor composition.

TREATMENT OF PRECURSOR WITH BORON HALIDE COMPOUND

After blending or impregnating the precursor composition into the carrier material, the diluted precursor composition is treated with the boron halide compound. Treatment can be effected by dissolving the boron halide compound in an inert liquid solvent and applying the resulting solution to the diluted precursor composition in any convenient manner, preferably by simply immersing the diluted precursor composition in the solution. The solvent employed must be non-polar, inert to the boron halide compound and all the components of the catalyst, and capable of dissolving the boron halide compound but not the precursor composition. Polar solvents are undesirable because they dissolve and form complexes with the precursor composition as well as with the boron halide compound. In order to avoid the formation of such complexes, it is essential to treat the precursor composition with a solution of the boron halide compound in a non-polar solvent as an independent step after formation of the precursor composition in a polar electron donor solvent.

If desired, the diluted precursor composition may be added to the inert liquid solvent to form a slurry before the boron halide compound is dissolved in the solvent. This technique is particularly suitable when a gaseous material, such as $BCl_3$, is employed. Such gaseous material can be dissolved in the solvent after formation of the slurry by bubbling it through the slurry or, if desired, by first liquifying it and then adding it to the slurry. Alternatively, the boron halide compound can be dissolved in an inert liquid solvent before it is added to the slurry or, if desired, directly added to the dry diluted precursor composition.

Among the solvents which can be employed to dissolve the boron halide compound are hydrocarbon solvents, including substituted hydrocarbon solvents, such as isopentane, hexane, heptane, toluene, xylene, naphtha and methylene chloride. Preferably, such solvents are employed together with the boron halide compound in such amounts that the resulting solution contains from about 1 percent by weight to about 15 percent by weight of the boron halide compound.

Usually treatment of the diluted precursor composition with the boron halide compound is effected at room temperature. However, if desired, treatment can be effected at a temperature as low as about $-30°$ C. When the boron halide is applied in solution, the temperature should not exceed the boiling point of the solution. In any event, the precursor composition should be allowed to absorb a sufficient amount of a sufficiently concentrated boron halide solution, or gaseous boron halide compound, such that it will contain, after drying, from about 0.1 mol to about 3.0 mols, preferably from about 0.3 mol to about 1.0 mol, of the boron halide compound per mol of electron donor in the precursor composition. Generally, treatment periods of from about 1 hour to about 24 hours, usually from about 4 hours to about 10 hours, are sufficient for the purpose.

ACTIVATION OF PRECURSOR COMPOSITION

In order to be useful in producing ethylene polymers, the treated precursor composition must first be activated, that is, it must be treated with sufficient activator compound to transform the Ti atoms in the precursor composition to an active state.

The precursor composition may be partially activated before it is introduced into the polymerization reactor. When the precursor composition is partially activated in this manner, enough activator should be employed to provide the precursor composition with an activator compound/Ti molar ratio of up to 10:1, and preferably of about 4:1 to about 8:1. This partial activation reaction is preferably carried out in a hydrocarbon solvent slurry followed by drying of the resulting mixture, to remove the solvent, at temperatures between about 20° and 80° C., preferably between about 50° C. and 70° C. The resulting product is a free-flowing solid particulate material which can be readily fed to the polymerization reactor where the activation is completed with additional activator compound which can be the same or a different compound.

If desired, partial activation may be carried out in the same slurry in which the precursor composition is treated with the boron halide compound.

Alternatively, when an impregnated precursor composition is employed, it may, if desired, be completely activated in the polymerization reactor without any prior activation outside of the reactor.

The partially activated or totally unactivated precursor composition and the required amount of activator compound necessary to complete activation of the precursor composition are preferably fed to the reactor through separate feed lines. The activator compound may be sprayed into the reactor in the form of a solution thereof in a hydrocarbon solvent such as isopentane, hexane, or mineral oil. This solution usually contains from about 2 to about 30 weight percent of the activator compound. The activator compound is added to the reactor in such amounts as to provide, in the reactor, a total Al//Ti molar ratio of from 10:1 to 400:1, and preferably of about 15:1 to 30:1.

In a continuous gas phase process, such as the fluid bed process disclosed below, discrete portions of the partially activated or totally unactivated precursor composition are continuously fed to the reactor, with discrete portions of activator compound needed to complete the activation of the partially activated precursor composition or to activate the unactivated precursor composition, during the continuing polymerization process in order to replace active catalyst sites that are expended during the course of the reaction.

THE POLYMERIZATION REACTION

The polymerization reaction is conducted by contacting a stream of the monomer(s), in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

In order to obtain the desired high density ethylene polymers, no more than 3 mol percent of any other alpha olefin should be copolymerized with the ethylene monomer. For this reason, no more than 50 mol percent of such alpha olefin should be present in the recycled gas stream of monomers in the reactor.

A fluidized bed reaction system which can be used in the practice of the process of the present invention is illustrated in the drawing. With reference thereto the reactor 1 consists of a reaction zone 2 and a velocity reduction zone 3.

The reaction zone 2 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$, and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100-111 (1966).

It is essential that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially activated or totally unactivated precursor composition used in the fluidized bed is preferably stored for service in a reservoir 4 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determined the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 6 to the reactor at point 7 below the bed. At that point there is a gas distribution plate 8 above the point of return to aid in fluidizing the bed.

The portion of the gas stream which does not react in the bed constitutes the recycle gas which is removed from the polymerization zone, preferably by passing it into a velocity reduction zone 3 above the bed where entrained particles are given an opportunity to drop back into the bed.

The recycle gas is then compressed in a compressor 9 and then passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growing and formed particulate polymer particles as well as catalyst particles. As the polymer particles are hot and possibly active, they must be prevented from settling, for is a quiescent mass is allowed to exist, any active catalyst contained therein may continue to react and cause fusion. Diffusing recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen is used as a chain transfer agent in the polymerization reaction of the present invention. The ratio of hydrogen/ethylene employed will vary between 0.1 to about 2.0 moles of hydrogen per mole of the monomer in the gas stream.

Any gas inert to the catalyst and reactants can also be present in the gas stream. The activator compound is preferably added to the reaction system downstream from heat exchanger 10. Thus, the activator compound may be fed into the gas recycle system from dispenser 11 through line 12.

Compounds of the structure $Zn(R_a)(R_b)$, wherein $R_a$ and $R_b$ are the same or different aliphatic or aromatic hydrocarbon radicals containing from 1 to 14 carbon atoms, may be used in conjunction with hydrogen, with the treated catalysts of the present invention, as molecular weight control or chain transfer agents, that is, to increase the melt index values of the polymers that are produced. About 0 to about 100, and preferably about 20 to about 30 moles of the zinc compound (as Zn) would be used in the gas stream in the reactor per mol of titanium compound (as Ti) in the reactor. The zinc compound would be introduced into the reactor, preferably in the form of a dilute solution (about 2 to about 30 weight percent) in a hydrocarbon solvent or absorbed on a solid diluent material, such as silica, in amounts of about 10 to about 50 weight percent. These compositions tend to be pyrophoric. The zinc compound may be added alone, or with any additional portions of the activator compound that are to be added to the reactor, from a feeder, not shown, which could be positioned adjacent to dispenser 11.

It is essential to operate the fluid bed reactor at a temperature below the sintering temperature of the polymer particles to insure that sintering will not occur. To produce high density polymers having high melt indices a low melt flow ratios, an operating temperature of from about 90° C. to about 115° C. is preferred. As explained above, after treatment with a boron halide compound in accordance with the present invention, the catalysts employed in the polymerization process are rendered more stable when exposed to temperatures in excess of 90° C. and are capable of producing polymers at higher productivities and with less accompanying ethylene hydrogenation than when like untreated catalyst compositions are employed.

The fluid bed reactor is operated at pressures of up to about 1000 psi, and is preferably operated at a pressure of from about 100 to about 300 psi, with operation at the higher pressures in such ranges favoring heat transfer since an increase in pressure increases the unit volume heat capacity of the gas.

The partially activated or totally unactivated precursor composition is injected into the bed at a rate equal to its consumption at a point 13 which is above the distribution plate 8. Preferably, the precursor composition is injected at a point in the bed where good mixing of polymer particles occurs. Injecting the precursor composition at a point above the distribution plate is an important feature of this invention. Since the catalyst formed from such precursor composition is highly active, injection of the precursor composition into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the precursor composition into the reactor above the bed may result in excessive catalyst carryover into the recycle line where polymerization may begin and plugging of the line and heat exchanger may eventually occur.

A gas which is inert to the catalyst, such as nitrogen or argon, is used to carry the partially activated or totally unactivated precursor composition into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards and downwards to accommodate the change in rate of heat generation. This insures the maintenance of an essentially temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 14 at or close to the distribution plate 8 and in suspension with a portion of the gas stream which is vented as the particles settle to minimize further polymerization and sintering when the particles reach their ultimate collection zone. The suspending gas may also be used to drive the product of one reactor to another reactor.

The particulate polymer product is conveniently and preferably withdrawn through the sequential operation or a pair of timed valves 15 and 16 defining a segregation zone 17. While valve 16 is closed, valve 15 is opened to emit a plug of gas and product to the zone 17 between it and valve 15 which is then closed. Valve 16 is then opened to deliver the product to an external recovery zone. Valve 16 is then closed to await the next product recovery operation. The vented gas containing unreacted monomers may be recovered from zone 17 through line 18 and recompressed in compressor 19 and returned directly, or through a purifier 20, over line 21 to gas recycle line 6 at a point upstream of the recycle compressor 9.

Finally, the fluidized bed reactor is equipped with an adequate venting system to allow venting the bed during start up and shut down. The reactor does not require the use of stirring means and/or wall scraping means. The recycle gas line 6 and the elements therein (compressor 9, heat exchanger 10) should be smooth surfaced, and devoid of unnecessary obstructions so as not to impede the flow of recycle gas.

The highly active catalyst systems of this invention yield a fluid bed product having an average particle size of about 0.02 inches to about 0.05 inches, and preferably about 0.02 inches to about 0.04 inches, in diameter wherein the catalyst residue is unusually low. The polymer particles are relatively easy to fluidize in a bed.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: A plaque is made and conditioned for one hour at 120° C. to approach equilibrium crystallinity and is then quickly cooled to room temperature. Measurement for density is then made in a density gradient column and density values are reported as grams/cm$^3$.

Melt Index (MI): ASTM D-1238—Condition E—Measured at 190° C.—reported as grams per 10 minutes.

Flow Index (HLMI): ASTM D-1238—Condition F—Measured at 10 times the weight used in the melt index test above.

Melt Flow Ratio (MFR)=Flow Index/Melt Index

Productivity: A sample of the resin product is ashed, and the weight % of ash is determined; since the ash is essentially composed of the catalyst, the productivity is thus the pounds of polymer produced per pound of total catalyst consumed. The amount of Ti, Mg,B and halide in the ash are determined by elemental analysis.

Bulk Density: ASTM D-1895 Method B. The resin is poured via ⅞" diameter funnel into a 400 ml graduated cylinder to 400 ml line without shaking the cylinder, and weighed by difference.

Average Particle Size: This is calculated from sieve analysis data measured according to ASTM D-1921 Method A using a 500 g sample. Calculations are based on weight fractions retained on the screens.

EXAMPLE 1

Impregnation of Support with Precursor

In a 12 liter flask equipped with a mechanical stirrer were placed 41.8 g (0.439 mol) anhydrous MgCl$_2$ and 2.5 liter tetrahydrofuran (THF). To this mixture, 27.7 g (0.146 mol) TiCl$_4$ were added dropwise over ¼ hour. The mixture was heated at 60° C. for about ½ hour in order to completely dissolve the material.

Five hundred grams (500 g) of silica was dehydrated by heating at a temperature of 800° C. and slurried in 3 liters of isopentane. The slurry was stirred while 142 ml. of a 20 percent by weight solution of triethyl aluminum in hexane was added thereto over a ¼ hour period. The mixture was dried under a nitrogen purge at 60° C. for about 4 hours to provide a dry, free flowing powder containing 4 percent by weight of the aluminum alkyl. Alternatively, the silica is dried and treated in like manner with a solution of tri-n-hexyl aluminum or diethylzinc to provide a treated silica containing 4 percent by weight of metal alkyl.

The treated silica was then added to the solution prepared as above and stirred for ¼ hour. The mixture was dried under a nitrogen purge at 60° C. for about 4 hours to provide a dry, impregnated, free flowing powder having the particle size of the silica.

EXAMPLE 2

Treatment of Precursor with Boron Trichloride

Five hundred grams (500 g) of silica impregnated precursor composition prepared in accordance with Example 1 was slurried in 3 liters of isopentane and stirred while a 1 molar solution of boron trichloride in methylene dichloride was added thereto over a ¼ hour period. The silica impregnated precursor composition and the boron trichloride solution were employed in amounts that provided a molar ratio of boron to electron donor compound (of the precursor) of 0.75:1. The mixture was dried under a nitrogen purge at 60° C. for about 4 hours to provide a dry free flowing powder having the particle size of the silica.

EXAMPLE 3

Treatment of Precursor with Ethyl Boron Dichloride

Five hundred grams (500 g) of silica impregnated precursor composition prepared in accordance with Example 1 was slurried in 3 liters of isopentane and stirred while a 10 percent by weight solution of ethyl boron dichloride in heptane was added thereto over a ¼ hour period. The silica impregnated precursor composition and the ethyl boron dichloride solution were employed in amounts that provided a molar ratio of boron to electron donor compound (of the precursor) of 0.75:1. The mixture was dried under a nitrogen purge of 60° C. for about 4 hours to provide a dry free flowing powder having the particle size of the silica.

EXAMPLE 4

Preparation of Partially Activated Precursor

After treatment with boron halide compound in accordance with Examples 2 and 3, desired weights of each of the silica impregnated precursor compositions prepared in accordance with those examples were slurried in anhydrous isopentane together with sufficient activator compound to provide partially activated precursor compositions having Al/Ti molar ratios of 4:1.

In each instance, the contents of the slurry system were thoroughly mixed at room temperature for about ¼ to ½ hour. Each slurry was then dried under a purge of dry nitrogen at a temperature of 65°±10° C. for about 4 hours to remove the isopentane diluent. A free flowing particulate material containing partially activated precursor composition impregnated within the pores of the silica and having the size and shape of the silica was obtained. This material was stored under dry nitrogen until ready to be used.

EXAMPLES 5-8

Ethylene was homopolymerized in a series of 4 experiments employing the fluid bed reaction system described and illustrated herein. The polymerization reactor had a lower section 10 feet high and 13½ inches in diameter, and an upper section 16 feet high and 23½ inches in diameter.

Each of the polymerization reactions was conducted for 24 hours at 105° C. under a pressure of 300 psig, a gas velocity of about 3 to 6 times Gmf, a space time yield of about 2.8 to 4.9, and a $H_2/C_2$ mol ratio of 0.35 to 0.42.

In the first polymerization (Example 5), silica impregnated precursor composition prepared in accordance with Example 1 was fed to the polymerization reactor along with a 5 percent by weight solution of triethyl aluminum in isopentane so as to provide a completely activated catalyst in the reactor having an Al/Ti mol ratio of 15:1 to 30:1.

In the next three polymerizations (Examples 6–8), silica impregnated precursor composition prepared in accordance with Example 1 was first treated with a boron halide compound in accordance with Example 2 or 3 before it was fed to the polymerization reactor. Activation of the precursor composition was effected as in the first polymerization.

Table I below summarizes the reaction conditions employed in each example, the properties of the polymers made in such examples, the amount of ethylene hydrogenation which occurred during polymerization, and the productivity of each catalyst system.

TABLE I

| Example | 5 | 6 | 7 | 8 |
|---|---|---|---|---|
| Silica Pretreatment | Et₃Al | Et₃Al | Et₂Zn | Et₃Al |
| Boron Halide Compound | None | BCl₃ | BCl₃ | EtBCl₂ |
| Polymerization Conditions | | | | |
| Activator | Et₃Al | Et₃Al | Et₃Al | Et₃Al |
| Temperature, °C. | 105 | 105 | 105 | 105 |
| Pressure, psig | 300 | 300 | 300 | 300 |
| Space-time yield (lbs/hr/ft³) | 2.8 | 4.9 | 4.1 | 4.2 |
| H₂/C₂ mol ratio | 0.42 | 0.36 | 0.35 | 0.39 |
| Polymer Properties | | | | |
| Melt Index, g/10 min | 7 | 8 | 8 | 9 |
| Melt Flow Ratio | 30 | 27 | 27 | 26 |
| Density, g/cm³ | 0.968 | 0.967 | 0.966 | 0.967 |
| Hydrogenation | | | | |
| % conversion of C₂H₄ | 0.96 | 0.39 | 0.21 | 0.32 |
| Productivity | | | | |
| lbs polymer/lb Ti | 65,000 | 245,000 | 350,000 | 280,000 |
| ppm Ti in polymer | 15.5 | 4 | 2 | 3.5 |

EXAMPLES 9-12

Ethylene was homopolymerized in a series of 4 experiments employing the same fluid bed reaction system employed in Examples 5-8.

In this series of polymerizations, the silica impregnated precursor composition employed was prepared in accordance with Example 1 and partially activated as described in Example 4 before it was fed into the reactor. In the first two experiments (Examples 9 and 10), the precursor composition was not treated with a boron halide compound before it was partially activated. In the next two experiments (Examples 11 and 12), the precursor composition was treated with boron trichloride in accordance with Example 2 before it was partially activated.

In each instance, activation of the precursor composition was completed in the reactor by adding a 5 percent by weight solution of aluminum alkyl in isopentane to the reactor to provide a completely activated catalyst having an Al/Ti mol ratio of 15:1 to 30:1.

Each polymerization was conducted for 24 hours at 105° C. under a pressure of 300 psig, a gas velocity of about 3 to 6 times Gmf, a space time yield of about 3.3 to 5.0, and a $H_2/C_2$ mol ratio of 0.40 to 0.51.

Table II below summarizes the reaction conditions employed in each example, the properties of the polymers made in such examples, the amount of ethylene hydrogenation which occurred during polymerization, and the productivity of each catalyst system.

TABLE II

| Example | 9 | 10 | 11 | 12 |
|---|---|---|---|---|
| Silica Pretreatment | Et$_3$Al | Et$_3$Al | (C$_6$H$_{13}$)$_3$Al | Et$_3$Al |
| Boron Halide Compound | None | None | BCl$_3$ | BCl$_3$ |
| Partial Activation (outside reactor) | (C$_6$H$_{13}$)$_3$Al | (C$_6$H$_{13}$)$_3$Al | (C$_6$H$_{13}$)$_3$Al | (C$_8$H$_{17}$)$_3$Al |
| Complete Activation (inside reactor) | Et$_3$Al | Et$_3$Al | Et$_3$Al | (CH$_3$)$_3$Al |
| Polymerization Conditions | | | | |
| Temperature, °C. | 105 | 105 | 105 | 105 |
| Pressure, psig | 300 | 300 | 300 | 300 |
| Space-time yield (lbs/hr/ft$^3$) | 3.3 | 5.0 | 3.5 | 5.0 |
| H$_2$/C$_2$ mol ratio | 0.45 | 0.51 | 0.41 | 0.40 |
| Polymer Properties | | | | |
| Melt Index, g/10 min | 9 | 13 | 9 | 9 |
| Melt Flow Ratio | 27 | 27 | 25 | 25 |
| Density, g/cm$^3$ | 0.969 | — | 0.967 | 0.967 |
| Hydrogenation | | | | |
| % conversion of C$_2$H$_4$ | 2.66 | 1.79 | 1.49 | 1.03 |
| Productivity | | | | |
| lbs polymer/lb Ti | 90,000 | 118,000 | 135,000 | 210,000 |
| ppm Ti in polymer | 12 | 8.5 | 7.5 | 5 |

What is claimed is:

1. A precursor composition suitable as a component of a catalyst composition capable of producing high density ethylene homopolymers and copolymers under a pressure of less than 1000 psi with low accompanying ethylene hydrogenation, said precursor composition having the formula $$Mg_mTi(OR)_nX_p[ED]_q$$

wherein

R is an aliphatic or aromatic hydrocarbon radical containing from 1 to 14 carbon atoms, or COR' wherein R' is an aliphatic or aromatic hydrocarbon radical containing from 1 to 14 carbon atoms, X is selected from the group consisting of Cl, Br, I, and mixtures thereof, ED is an organic electron donor compound selected from the group consisting of alkyl esters of aliphatic and aromatic acids, aliphatic ethers, cyclic ethers and aliphatic ketones, m is 0.5 to 56, n is 0, 1 or 2, p is 2 to 116, and q is 2 to 85, said precursor composition being diluted with an inert carrier material and containing from 0.1 mol to 3.0 mols of boron halide compound per mol of electron donor in said precursor composition, said boron halide compound having the formula $$BR_cX'_{3-c}$$

wherein

R is an aliphatic or aromatic hydrocarbon radical containing from 1 to 14 carbon atoms or OR', wherein R' is an aliphatic or aromatic hydrocarbon radical containing from 1 to 14 carbon atoms, X' is selected from the group consisting of Cl, Br, and mixtures thereof, and c is 0 or 1 when R is an aliphatic or aromatic hydrocarbon and 0, 1 or 2 when R is OR'.

2. A precursor composition as in claim 1 wherein said precursor composition is mechanically mixed with the inert carrier material and the blended mixture contains from 10 percent by weight to 50 percent by weight of the precursor composition.

3. A precursor composition as in claim 1 wherein the inert carrier material is impregnated with the precursor composition and the impregnated carrier material contains from 3 percent by weight to 50 percent by weight of the precursor composition.

4. A precursor composition as in claim 1 2 or 3 wherein the inert carrier material is silica.

5. A precursor composition as in claim 4 wherein X and X' are Cl, [ED] is tetrahydrofuran, n is 0, m is 1.5 to 5, p is 6 to 14, and q is 3 to 10.

6. A precursor composition as in claim 5 wherein the boron halide compound is boron trichloride.

7. A precursor composition as in claim 5 wherein the boron halide compound is ethyl boron dichloride.

8. A precursor composition as in claim 4 wherein the silica is modified with diethylzinc.

9. A composition as in claim 1, 2 or 3 which has been partially activated with up to 10 mols of an activator compound per mol of titanium in said precursor composition, said activator compound having the formula $$Al(R'')_dX''_eH_f$$

wherein X'' is Cl or OR''', R'' and R''' are the same or different and are saturated hydrocarbon radicals containing from 1 to 14 carbon atoms, e is 0 to 1.5, f is 1 or 0 and d+e+f=3.

10. A composition as in claim 9 wherein the inert carrier material is silica.

11. A composition as in claim 10 wherein X and X' are Cl, [ED] is tetrahydrofuran, n is 0, m is 1.5 to 5, p is 6 to 14, and q is 3 to 10.

12. A composition as in claim 11 wherein the boron halide compound is boron trichloride.

13. A composition as in claim 11 wherein the boron halide compound is ethyl boron dichloride.

14. A composition as in claim 10 wherein the silica is modified with diethylzinc.

15. A process for preparing a treated precursor composition suitable as a component of a catalyst composition capable of producing high density ethylene homopolymers and copolymers under a pressure of less than 1000 psi with low accompanying ethylene hydrogenation which comprises (A) forming a precursor composition of the formula $$Mg_mTi(OR)_nX_p[ED]_q$$

wherein
R is an aliphatic or aromatic hydrocarbon radical containing from 1 to 14 carbon atoms, or COR' wherein R' is an aliphatic or aromatic hydrocarbon radical containing from 1 to 14 carbon atoms,
X is selected from the group consisting of Cl, Br, I, and mixtures thereof,
ED is an organic electron donor compound selected from the group consisting of alkyl esters of aliphatic and aromatic acids, aliphatic ethers, cyclic ethers and aliphatic ketones,
m is 0.5 to 56,
n is 0, 1 or 2,
p is 2 to 116, and
q is 2 to 85,
by dissolving at least one magnesium compound and at least one titanium compound in at least one liquid organic electron donor compound so as to from a solution of said precursor composition in said electron donor compound,
said magnesium compound having the structure $MgX_2$,
said titanium compound having the structure $Ti(OR)_aX_b$ wherein a is 0, 1 or 2, b is 1 to 4 inclusive and a+b=3 or 4,
said magnesium compound, said titanium compound, and said electron donor compound being employed in such amounts as to satisfy the values of m, n, p and q,
(B) diluting said precursor composition with an inert carrier material, and
(C) treating said diluted precursor composition with a boron halide compound having the formula $$BR_cX'_{3-c}$$

wherein
R is an aliphatic or aromatic hydrocarbon radical containing from 1 to 14 carbon atoms or OR', wherein R' is an aliphatic or aromatic hydrocarbon radical containing from 1 to 14 carbon atoms,
X' is selected from the group consisting of Cl, Br, and mixtures thereof, and
c is 0 or 1 when R is an aliphatic or aromatic hydrocarbon radical and 0, 1 or 2 when R is OR'.

16. A process as in claim 15 wherein said precursor composition is mechanically mixed with the inert carrier material to form a blended mixture containing from 10 percent by weight to 50 percent by weight of the precursor composition.

17. A process as in claim 15 wherein the inert carrier material is impregnated with the precursor composition and the impregnated carrier material contains from 3 percent by weight to 50 percent by weight of the precursor composition.

18. A process as in claims 15, 16 or 17 wherein the inert carrier material is silica.

19. A process as in claim 18 wherein X and X' are Cl, [ED] is tetrahydrofuran, n is 0, 1 m is 1.5 to 5, p is 6 to 14, and q is 3 to 10.

20. A process as in claim 19 wherein the boron halide compound is boron trichloride.

21. A process as in claim 19 wherein the boron halide compound is ethyl boron dichloride.

22. A process as in claim 18 wherein the silica is modified with diethylzinc.

* * * * *